United States Patent [19]

Peppiatt et al.

[11] Patent Number: 4,674,583

[45] Date of Patent: Jun. 23, 1987

[54] IMPULSE DRIVE

[76] Inventors: Alvin C. Peppiatt, 435 Heller St.; Alfred J. Peppiatt, c/o Alvin C. Peppiatt, 435 Heller St., both of Redwood City, Calif. 94063

[21] Appl. No.: 833,138

[22] Filed: Feb. 26, 1986

[51] Int. Cl.⁴ ............................................. B60K 26/04
[52] U.S. Cl. ...................................... 180/7.1; 74/84 S; 74/393; 180/54.1; 180/65.6
[58] Field of Search ................ 74/84 S, 393; 280/218; 180/54.1, 291, 65.1, 7.1, 65.6; 464/117, 179

[56] References Cited

U.S. PATENT DOCUMENTS

| | | | |
|---|---|---|---|
| 2,030,511 | 2/1936 | Gruber | 180/14.1 X |
| 2,418,368 | 4/1947 | Schroeder | 280/218 |
| 2,636,340 | 4/1953 | Llamozas | 74/84 S |
| 3,266,233 | 8/1966 | Farrall | 74/84 S |
| 3,427,824 | 2/1969 | Mayrath | 464/117 |
| 3,492,881 | 2/1970 | Auweele | 74/84 S |
| 3,530,617 | 9/1970 | Halvorson et al. | 74/84 S |
| 4,121,436 | 10/1978 | Garrison | 180/14.1 X |

Primary Examiner—John J. Love
Assistant Examiner—Michael Mar
Attorney, Agent, or Firm—Julian Caplan

[57] ABSTRACT

A prime mover is connected by a series of universal joints to a crank which reciprocates a weight. The joints are arranged in such manner that the weight moves substantially faster in one direction than in the opposite direction causing a force to be applied to the structure in the first direction. When the structure is mounted on a vehicle the vehicle is caused to move in the first direction.

5 Claims, 3 Drawing Figures

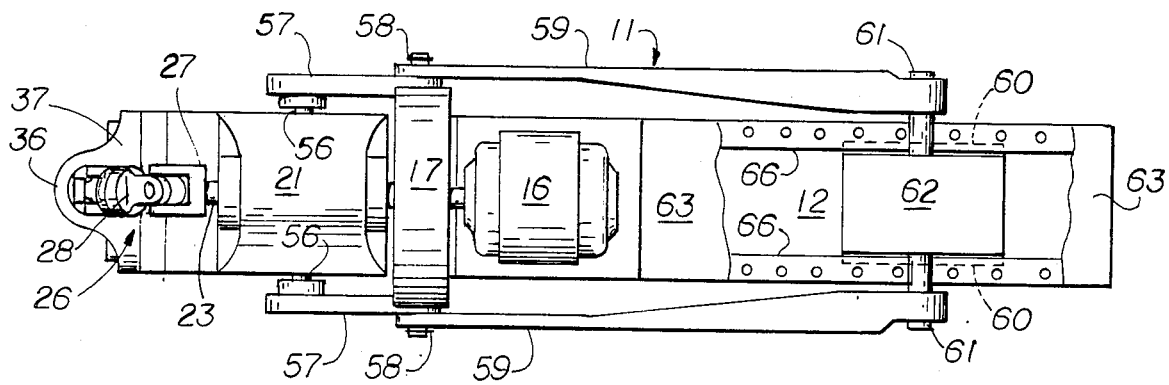
Fig.2
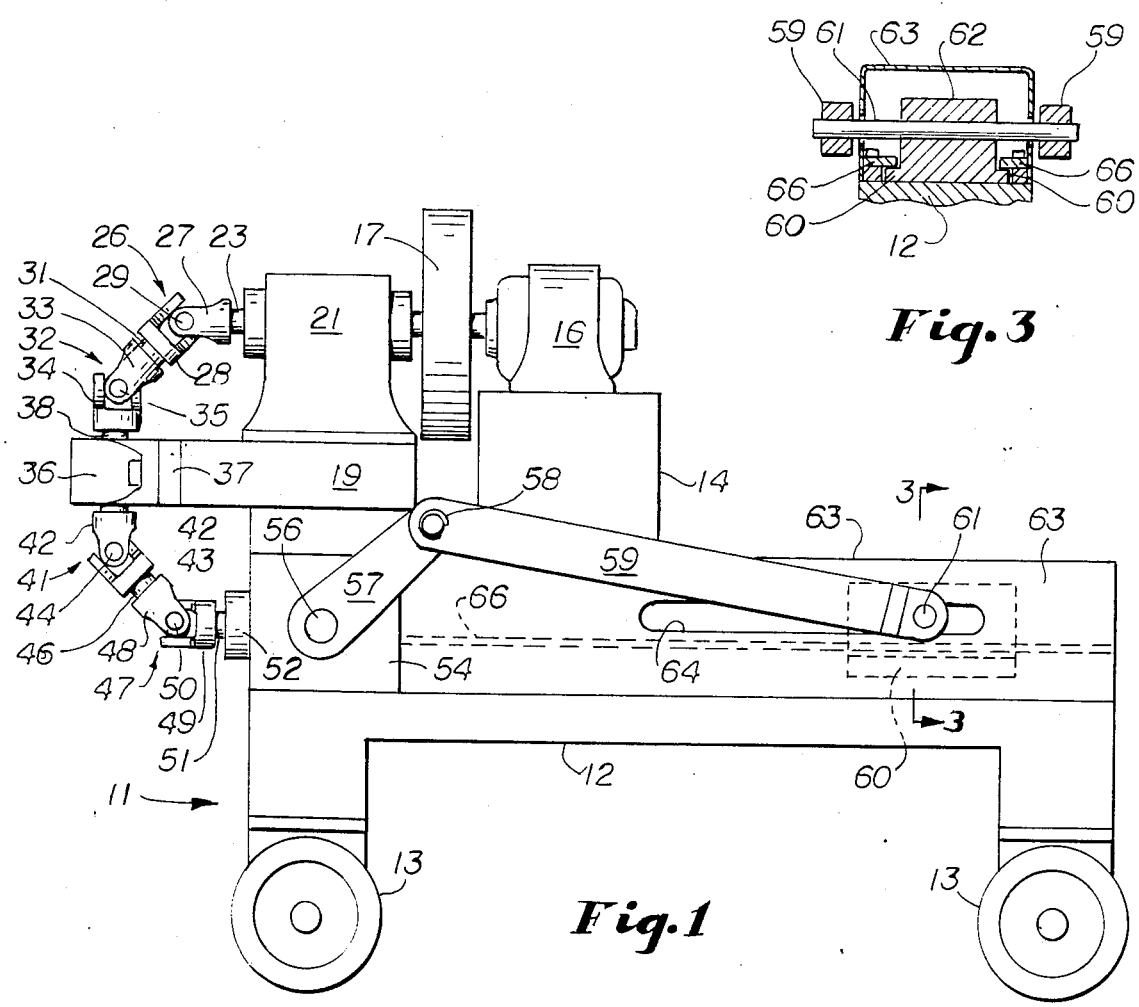
Fig.3
Fig.1

IMPULSE DRIVE

BACKGROUND OF THE INVENTION

1. Field of the Invention

This invention relates to a new and improved propulsion device having an impulse drive using universal joints. As hereinafter described in detail, the invention is employed in a land vehicle but other applications, such as in boats, are contemplated. The device may also be used for such diversified purposes as a pile driver or other hammer or a carpet stretcher. Essentially, the invention takes advantage of the fact that universal joints, when the forks thereof are disposed at obtuse angles, rotate nonuniformly. By accumulating the nonuniform rate of rotation, a weight may be caused to reciprocate longitudinally of the vehicle, the weight velocity being high in one direction and low in the other. The variation in rate causes the device to tend to move in the direction of the high speed movement of the weight. If the device is mounted on wheels, the vehicle travels in the direction of the fast movement.

2. Description of Related Art

U.S. Pat. No. 2,030,511 shows a motion-transmitting mechanism using universal joints, but does not use these joints otherwise than for causing shafts to rotate around angles.

U.S. Pat. No. 4,121,436 shows a drive train employing universal joints, but again does not take advantage of the results obtained in accordance with the present invention. The same is true of U.S. Pat. No. 3,427,824.

U.S. Pat. No. 2,418,368 shows a vehicle which is advanced by an unbalanced force but on quite different principles.

SUMMARY OF THE INVENTION

The invention employs a prime mover, such as a motor or internal combustion engine, which turns one end of a first universal joint. Preferably there are at least four universal joints in a train around a 180 degree angle. Each joint speeds up and slows down twice per revolution, and the effect of the plural joints is cumulative. Since it is desired that there be only one acceleration per cycle, a one-to-two speed-up gear is used at the end of the chain, and this gear drives a crank which revolves twice per complete revolution of the U-joints. The crank causes a weight to reciprocate parallel to the direction of movement of the vehicle. The effect of the arrangement is that the weight is moved rapidly in the forward direction of the vehicle and slowly in the return direction. This causes the vehicle to move forwardly.

In most usages, universal joints are connected in pairs to prevent cogging—the nonconstant rate of rotation. In the present invention, the cogging is multiplied by the arrangement of the universal joints.

Other objects of the present invention will become apparent upon reading the following specification and referring to the accompanying drawings in which similar characters of reference represent corresponding parts in each of the several views.

In the drawings:

FIG. 1 is a side elevational view of a vehicle employing the present invention.

FIG. 2 is a top plan view thereof.

FIG. 3 is a sectional view taken substantially along line 3—3 of FIG. 1.

DESCRIPTION OF PREFERRED EMBODIMENTS

The present invention is shown incorporated in a vehicle having a chassis 11 provided with a horizontally disposed base 12 having ground support wheels 13 and a superstructure 14.

Mounted on the superstructure 14 is a prime mover 16, here shown to be an electric motor. It will be understood that an internal combustion engine may be substituted. The shaft of motor 16 drives a flywheel 17. The shaft also drives a reduction gear system 21 mounted on support 19. Thus, assuming that the motor turns at 3600 rpm, the gear system 21 reduces the speed of its shaft to 60 rpm.

The output shaft 23 of reduction gear 21 is connected to the first universal joint 26, here shown only partially, the structure of such universal joints being well understood in the machinery art. Thus there is a first fork 27 fixed to shaft 23 which is connected by pin 29 to a cross (not shown) which is connected by another pin to a second fork 28, the forks 27 and 28 being turned 90 degrees relative to each other and disposed so that the input shaft 23 and output shaft 31 (fixed to fork 28) are disposed at an obtuse angle of 135 degrees. Shaft 31 is connected to second universal joint 32, the first fork 33 of which is fixed to shaft 31. The fork 28 is turned 90° relative to fork 33. Each fork hereinafter mentioned is likewise turned 90° relative to the adjacent fork. Pin 35 attaches fork 33 to the cross (not shown) and another pin fixes the cross to the second fork 34 which is, in turn, fixed to shaft 38. Shaft 38 is received in a bearing 36 attached by mount 37 to the support 19.

Below bearing 36 is third universal joint 41. The fork 42 thereof is fixed to shaft 38 and attached by pin 44 to the cross (not shown) which is also attached by a pin (not shown) to the second fork 43 fixed to one end of shaft 46. The opposite end of shaft 46 is attached to fourth universal joint 47. Thus the fork 48 is fixed to shaft 46 and attached by pin 50 to the cross (not shown) which is attached by another pin (not shown) to the second fork 49. Fork 49 is fixed to shaft 51.

Shaft 51 is journalled in third bearing 52 fixed to the gearbox 54. Shaft 51 is part of a one-to-two right-angle gear box 54, also mounted on chassis 11. The output shaft of box 54 extends transversely across chassis 11. On either side of the chassis is a crank 57 fixed to shaft 56 connected by crank pin 58 to one end of connecting rod 59. The opposite end of rod 59 is connected by wrist pin 61 to weight 62 which reciprocates in ways on the base 12. Weight 62 is preferably in the shape of an inverted T (see FIG. 3) having lateral extensions 60 which fit under crosshead guide members 66 fixed to base 12 on either side. A cover 63 is provided having longitudinal slots 64 on either side for extension of wrist pin 61.

In operation, as the weight 62 reciprocates, it has a high speed in one direction (i.e., to the left, as viewed in FIGS. 1 and 2) and a slow speed in the opposite direction. This causes the vehicle to move toward the left. It is the theory of the inventor that the invention uses centrifugal inertia force to move the vehicle along in one direction. The connecting rod 59 changes the rotational force to a bi-directional force. The movement of the weight 62 between a rapid movement in the one direction and a slow movement in the opposite direction, is done by using the universal joints connected in series to give a ratio of about 8 to 1. The nonconstant velocity effect of the universal joint occurs twice each revolution. In order to change this to a single change, the 1 to 2 gear box 54 is used. Thus the crank shaft 56 speeds up and slows down only once each revolution.

It is true that, although the weight has more force in one direction than in the opposite direction, the momentum is equal in both directions. Therefore the machine will not start by itself. The momentum balance is disrupted by an outside force or by a one-way clutch or brake (not shown) to prevent backward motion. Once forward momentum is established, the outside force is no longer needed. The starting force may be a slope (as little as ⅛ of an inch per foot) or any other source.

Thus the prime mover 16 turns flywheel 17. The four universal joints rotate at a nonconstant rate. Each joint increases its shaft speed 2 to 1 during the fast cycle for a total of 8 to 1 for the four joints. During the slow cycle, shaft speed is reduced eight times.

Universal joints speed up or slow down twice per revolution. This can be overcome by using a 1 to 2 speed-up gear so that the crank 57 performs two complete revolutions per revolution of the universal joints.

As the crank 57 rotates, the weight 62 is moved to the right. The high kinetic energy of the weight pulls the machine along with it. The arm then moves the weight slowly back to the left and the cycle repeats.

What is claimed is:

1. A propulsion device comprising a frame, a prime mover mounted on said frame having a drive shaft, a weight, ways on said frame guiding said weight for reciprocation in a straight line, weight-driving means for reciprocating said weight in said ways, drive linkage means connecting said drive shaft to said weight-driving means for actuating said weight faster in a forward direction along said line and slower in a rearward direction for propelling said frame in a forward direction said drive linkage means comprising a first universal joint connected to said drive shaft, a second universal joint connected at an obtuse angle to said first universal joint, a third universal joint connected to said second universal joint at an obtuse angle, a fourth universal joint connected to said third universal joint at an obtuse angle and to said weight driving means, bearing means supporting said universal joints relative to said frame, and means for preventing movement of said frame in a rearward direction, each said universal joint having a first and a second fork, said forks being at 90° angles relative to adjacent forks.

2. A device according to claim 1 which further comprises a reduction gear system between said drive shaft and said first universal joint.

3. A device according to claim 1 which further comprises a step up gear box connected to said fourth universal joint and in which said weight-driving means comprises a crank connected to said step up gear, a connecting rod pivotally connected to said crank, a wrist pin connecting said connecting rod to said weight and a crosshead controlling reciprocation of said weight.

4. A device according to claim 3 in which said reduction gear is of a right-angle type.

5. A device according to claim 1 in which said obtuse angles are equal and are of approximately 135°.

* * * * *